US011157727B2

(12) United States Patent
Hu et al.

(10) Patent No.: US 11,157,727 B2
(45) Date of Patent: Oct. 26, 2021

(54) KEY-POINT GUIDED HUMAN ATTRIBUTE RECOGNITION USING STATISTIC CORRELATION MODELS

(71) Applicant: INTEL CORPORATION, Santa Clara, CA (US)

(72) Inventors: Ping Hu, Beijing (CN); Anbang Yao, Beijing (CN); Jia Wei, Beijing (CN); Dongqi Cai, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 16/647,722

(22) PCT Filed: Dec. 27, 2017

(86) PCT No.: PCT/CN2017/119027
§ 371 (c)(1),
(2) Date: Mar. 16, 2020

(87) PCT Pub. No.: WO2019/127108
PCT Pub. Date: Jul. 4, 2019

(65) Prior Publication Data
US 2020/0226362 A1    Jul. 16, 2020

(51) Int. Cl.
*G06K 9/62* (2006.01)
*G06K 9/00* (2006.01)
(Continued)

(52) U.S. Cl.
CPC ....... *G06K 9/00369* (2013.01); *G06K 9/6256* (2013.01); *G06K 9/66* (2013.01); *G06N 3/08* (2013.01)

(58) Field of Classification Search
CPC .... G06K 9/00369; G06K 9/6256; G06K 9/66; G06K 9/6273; G06N 3/08
See application file for complete search history.

(56) References Cited

U.S. PATENT DOCUMENTS 11,030,394 B1 * 6/2021 Kozareva ................ G06F 40/30
2006/0067573 A1 * 3/2006 Parr ......................... G06K 9/00
382/154

(Continued)

FOREIGN PATENT DOCUMENTS

| CN | 105631398 A | 6/2016 |
| CN | 107451568 A | 12/2017 |
| WO | 2019127108 A1 | 7/2019 |

OTHER PUBLICATIONS

International Preliminary Report on Patentability dated Jul. 9, 2020 for International Patent Application PCT/CN2017/119027, 5 pages.
International Search Report and Written Opinion received for PCT Application No. PCT/CN2017/119027, dated Oct. 10, 2018. 9 pages.

(Continued)

*Primary Examiner* — Howard D Brown, Jr.
(74) *Attorney, Agent, or Firm* — 2SPL Patent Attorneys PartG mbB; Kieran O'Leary (57) ABSTRACT

Techniques are provided for neural network based, human attribute recognition, guided by anatomical key-points and statistic correlation models. Attributes include characteristics that can be visibly identified or inferred from an image, such as gender, hairstyle, clothing style, etc. A methodology implementing the techniques according to an embodiment includes applying an attribute feature extraction (AFE) convolutional neural network (CNN) to an image of a human to generate attribute feature maps based on the image. The method further includes applying a key-point guided proposal (KPG) CNN to the image of the human to generate proposed hierarchical regions of the image based on associated anatomical key-points. The method further includes generating recognition probabilities for the human attributes using a CNN combination layer that incorporates the attribute feature maps, the proposed hierarchical regions, and statistical correlation models (SCMs) which provide (Continued)

correlations between the features of the attribute feature maps and the proposed hierarchical regions.

20 Claims, 9 Drawing Sheets

(51) Int. Cl.
*G06K 9/66* (2006.01)
*G06N 3/08* (2006.01)

(56) References Cited

U.S. PATENT DOCUMENTS

| | | | | |
|---|---|---|---|---|
| 2016/0328606 | A1* | 11/2016 | Bourdev | G06K 9/00362 |
| 2016/0342865 | A1* | 11/2016 | Tang | G06K 9/42 |
| 2019/0333623 | A1* | 10/2019 | Hibbard | A61N 5/1031 |
| 2020/0250408 | A1* | 8/2020 | Takeichi | A61B 5/1128 |
| 2020/0394413 | A1* | 12/2020 | Bhanu | G06N 3/0454 |

OTHER PUBLICATIONS

Bourdev, L. and J. Malik, "Poselets: Body Part Detectors Trained Using 3D Human Pose Annotations", 2009 IEEE 12th International Conference on Computer Vision (ICCV), 2009 IEEE, 8 pages.
Felzenszwalb, P.F. et al., "Object Detection with Discriminatively Trained Part Based Models", 2010, IEEE Trans. PAMI, 20 pages.
Zhang, N. et al., "PANDA: Pose Aligned Networks for Deep Attribute Modeling", arXiv:1311.5591v2, May 5, 2014, 8 pages.
Gkioxari, G. et al., "Actions and Attributes from Wholes and Parts", arXiv:1412.2604v2, May 5, 2015, 9 pages.
Girshick, R. et al., "Rich feature hierarchies for accurate object detection and semantic segmentation Tech report (v5)", arXiv:1311.2524v5, Oct. 22, 2014, 21 pages.
Gkioxari, G. et al., "Contextual Action Recognition with R*CNN", arXiv:1505.01197v3, Mar. 25, 2016, 10 pages.
Park, S. et al., "Attribute And-Or Grammar for Joint Parsing of Human Attributes, Part and Pose", arXiv:1605.02112v2, Jul. 7, 2016, 14 pages.

* cited by examiner

KEY-POINT GUIDED HUMAN ATTRIBUTE RECOGNITION USING STATISTIC CORRELATION MODELS

BACKGROUND

The recognition of human attributes, such as gender, hairstyle, clothing style (whether wearing a hat or not, whether wearing jeans or not), and the like, can be an important component of many applications including person identification, surveillance, security, smart home robotics, driverless cars, and drones, to name a few. The development of automated, accurate, and efficient vision systems with the capability for recognizing human attributes is gaining increased importance in academic, commercial, and industrial fields. However, this task still remains challenging in unconstrained settings.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for neural network based, human attribute recognition, guided by anatomical key-points and statistic correlation models. The attributes to be recognized include characteristics that can be visibly identified or inferred from an image, such as gender, hairstyle, clothing style, the wearing of a hat, eye glasses, footwear, etc. The key-points are associated with joints or connection points between different regions of the body, such as, for example, the neck, shoulders, elbows, wrists, hip, knees, and ankles. Distinct parts of the human body can be defined by such joint locations. For example, the forearm can be located based on the positions of the elbow and the wrist. Thus, according to an embodiment, the key-points are used to generate a hierarchy of proposed regions of the body which have a greater likelihood of being useful for consideration by the neural network in attribute recognition. Additionally, statistical correlations between attribute features extracted from the image and the proposed hierarchical regions are employed by the neural network to improve recognition performance, and to accelerate the training process with reduced processing time and memory requirements, as will be described in greater detail below. For example, since a hat is usually located on a person's head, and shoes are located on a person's feet, there can be a high correlation between key-points, proposed regions, and attributes, which can be exploited for attribute recognition.

The disclosed techniques can be implemented, for example, in a computing system or a software product executable or otherwise controllable by such systems, although other embodiments will be apparent. In some embodiments, the system or product is a neural network, comprising a number of sub-networks, configured to recognize attributes of a human in a provided image, while reducing any constraints imposed on the activity or pose depicted in the image. In accordance with an embodiment, a methodology to implement these techniques includes applying an attribute feature extraction (AFE) convolutional neural network (CNN) to an image of a human to generate attribute feature maps based on the image. The method further includes applying a key-point guided proposal (KPG) CNN to the image of the human to generate proposed hierarchical regions of the image based on associated anatomical key-points, which can reduce the number of regions for consideration by orders of magnitude. The method further includes generating recognition probabilities for the human attributes using a CNN combination layer that incorporates the attribute feature maps, the proposed hierarchical regions, and statistical correlation models (SCMs) that provide correlations between the features of the attribute feature maps and the proposed hierarchical regions.

As will be appreciated, the techniques described herein may allow for more efficient and accurate attribute recognition by limiting the number of regions for consideration by the network to a subset of all possible regions, wherein the proposed regions of the subset are more likely to be useful for accurate recognition. This approach provides improved performance compared to existing methods that require consideration of the entire body image, and which can aimlessly generate thousands of proposed regions for consideration, thus consuming greater processing and memory resources. The disclosed techniques can be implemented on a broad range of platforms including laptops, tablets, smart phones, workstations, cameras, and embedded systems or devices. These techniques may further be implemented in hardware or software or a combination thereof. In some embodiments, the efficiency improvements provided by the disclosed techniques can enable real-time performance, for example attribute recognition processing at a rate of 15 image frames per second or more.

Figure 1:
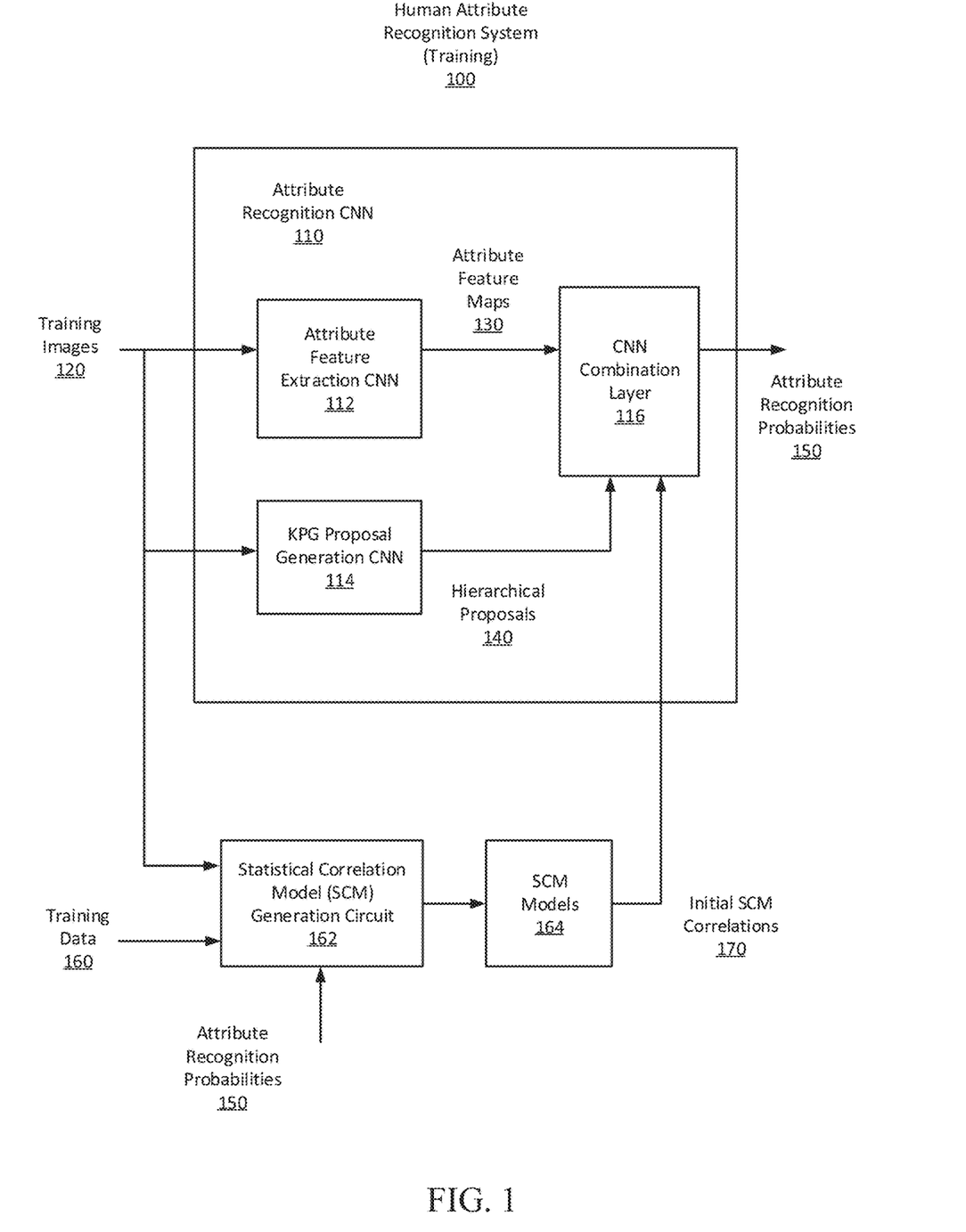
FIG. 1 is a block diagram of a human attribute recognition system, configured in accordance with certain embodiments of the present disclosure.

FIG. 1 is a block diagram of a human attribute recognition system 100, configured in accordance with certain embodiments of the present disclosure. In this figure, the system 100 is shown in a training configuration and includes an attribute recognition CNN 110 and an SCM generation circuit 162. The attribute recognition CNN 110 is further shown to include an AFE CNN 112, a KPG proposal generation CNN 114, and a CNN combination layer 116.

The AFE CNN 112 is configured to generate attribute feature maps 130 based on a provided image of a human. The feature maps are activation maps output from layers of the AFE CNN and are generated using known neural network techniques in light of the present disclosure. The AFE CNN is trained on training images 120 which depict humans in a wide variety of activities and with a large variation of viewpoints, pose, illumination, occlusion, and scale. The training images include attribute labels as truth data against which the network loss can be evaluated during backpropagation training iterations to calculate the network weights, using known neural network training techniques in light of the present disclosure.

Figure 2:
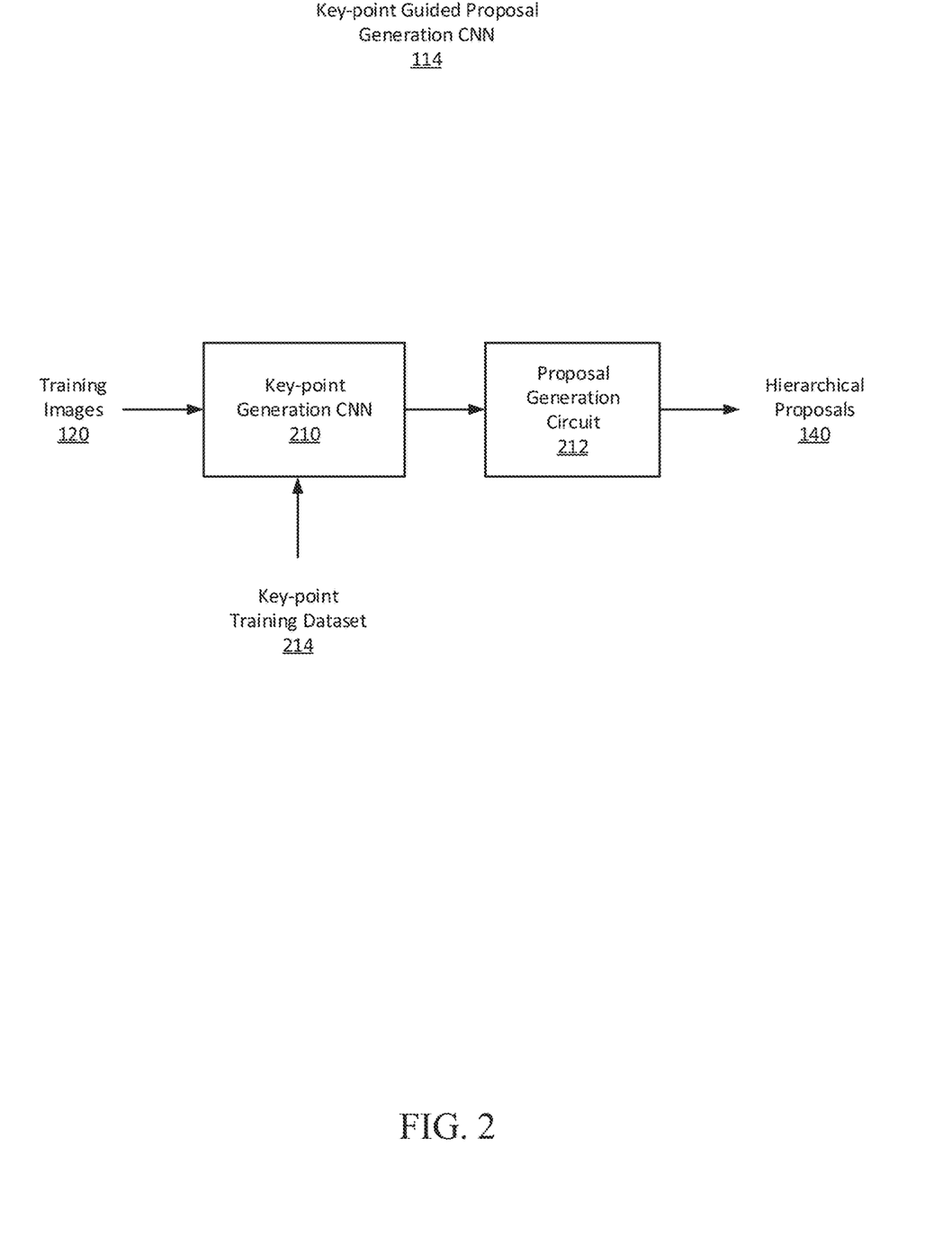
FIG. 2 is a block diagram of a key-point guided proposal generation network, configured in accordance with certain embodiments of the present disclosure.

The KPG proposal generation CNN 114 is configured to generate proposed hierarchical regions 140 (sometimes referred to simply as proposals) of the image of the human based on associated anatomical key-points. The KPG proposal generation CNN 114 is shown to include a key-point generation CNN 210 and a proposal generation circuit 212, as illustrated in FIG. 2, in accordance with certain embodiments of the present disclosure.

The KPG CNN 210 is configured to recognize key-points in a provided image of a human and is trained on training images 120 which also include labeled key-points as truth data. Additionally, in some embodiments, a key-point training data set 214 may be provided to enhance training of the KPG CNN 210. The key-point training data set 214 may include anatomical data, for example from biomedical studies and reference sources.

Figure 3:
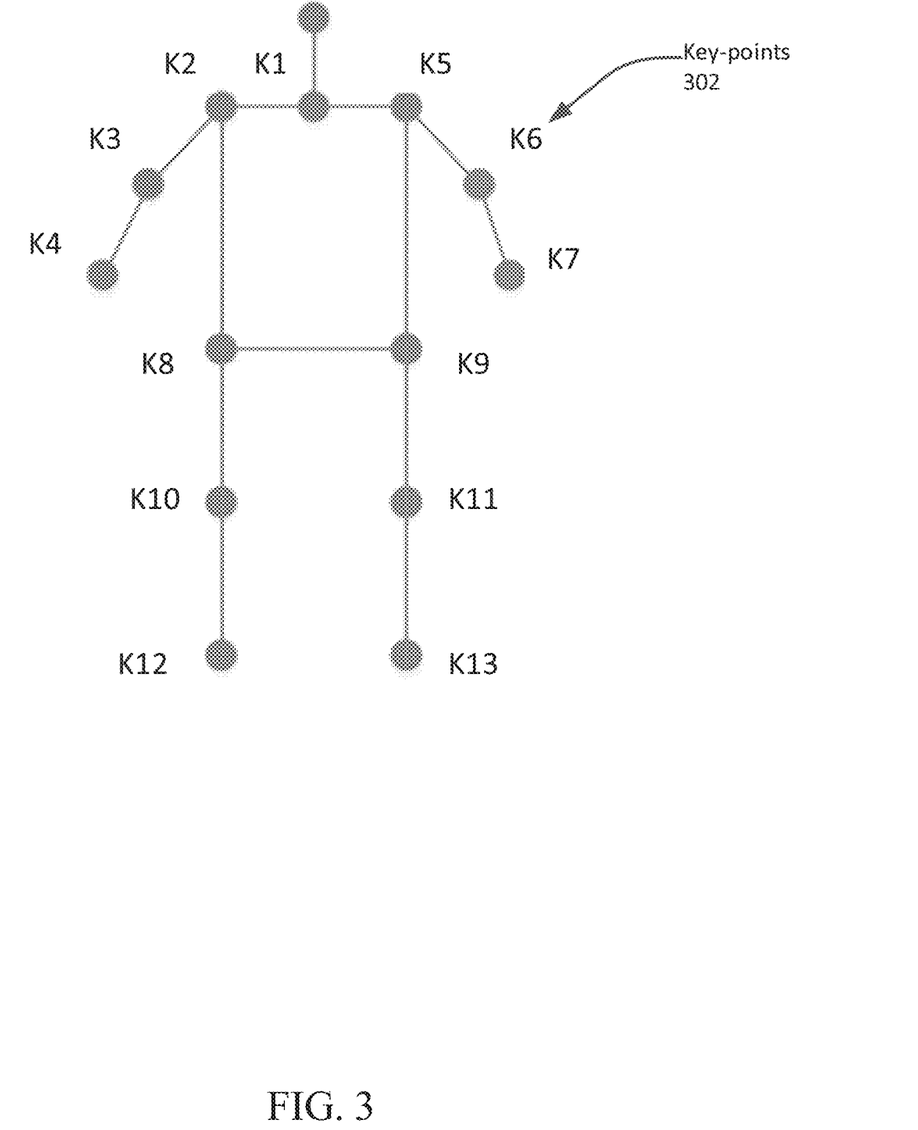
FIG. 3 illustrates anatomical key-points, in accordance with certain embodiments of the present disclosure.

Example key-points 302 are illustrated in FIG. 3, in accordance with certain embodiments of the present disclosure. These key-points include the neck (K1), the left shoulder (K2), the right shoulder (K5), the left elbow (K3), the right elbow (K6), the left wrist (K4), the right wrist (K7), the left hip (K8), the right hip (K9), the left knee (K10), the right knee (K11) the left ankle (K12), and the right ankle (K13), although other key-points are possible.

Proposal generation circuit 212 is configured to generate a hierarchy of proposed regions based on the key-points provided by KPG CNN 210. For example, the neck key-point K1 defines the proposal region containing the head. A coarse level proposal for the remainder of the body can be defined by the positions of left shoulder, right shoulder, left ankle, and right ankle. The body may then be divided into an upper and lower half at a lower level of the hierarchy. The coarse level upper body proposal can be defined by the left shoulder, right shoulder, left wrist, and right wrist. The upper body can then be sub-divided in more detailed proposal regions such as the trunk, arm, upper arm, and lower arm. The generation of proposal regions guided by key-points which include human structural information, reduces or eliminates the consideration of less relevant regions and improves computing efficiency.

Figure 4A:
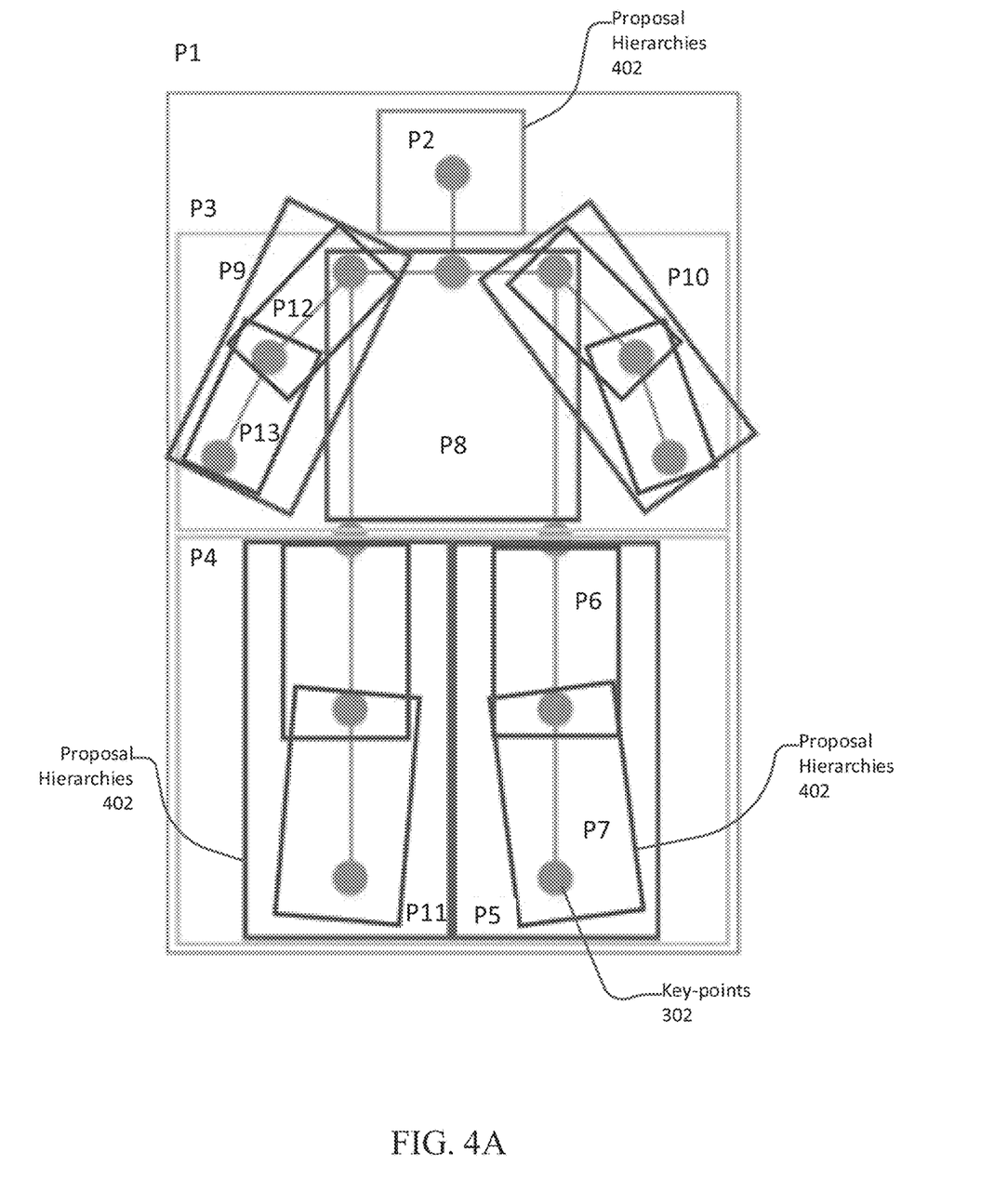
FIG. 4A illustrates proposed hierarchical regions, in accordance with certain embodiments of the present disclosure.

FIG. 4A illustrates proposed hierarchical regions 402, shown as rectangular regions, overlaid on key-points 302, in accordance with certain embodiments of the present disclosure. In this example, the proposed hierarchical regions include the entire body (P1) at the top level, followed by the head (P2), the upper torso (P3), the lower torso (P4) at the next level. At the next lower level, the upper torso (P3) is shown to include the chest (P8), the left arm (P9), and the right arm (P10). The lower torso (P4) includes the left leg (P11) and the right leg (P5). At a still lower level, the left arm (P9) is shown to include the left upper arm (P12) and the left lower arm (P13), while the right lower leg P5 is shown to include the right thigh (P6), and the right calf (P7). It will be appreciated that this is one example and that, in general, any number of suitable key-points may be used to define other types of hierarchical structures and related hierarchical regions.

Figure 4B:
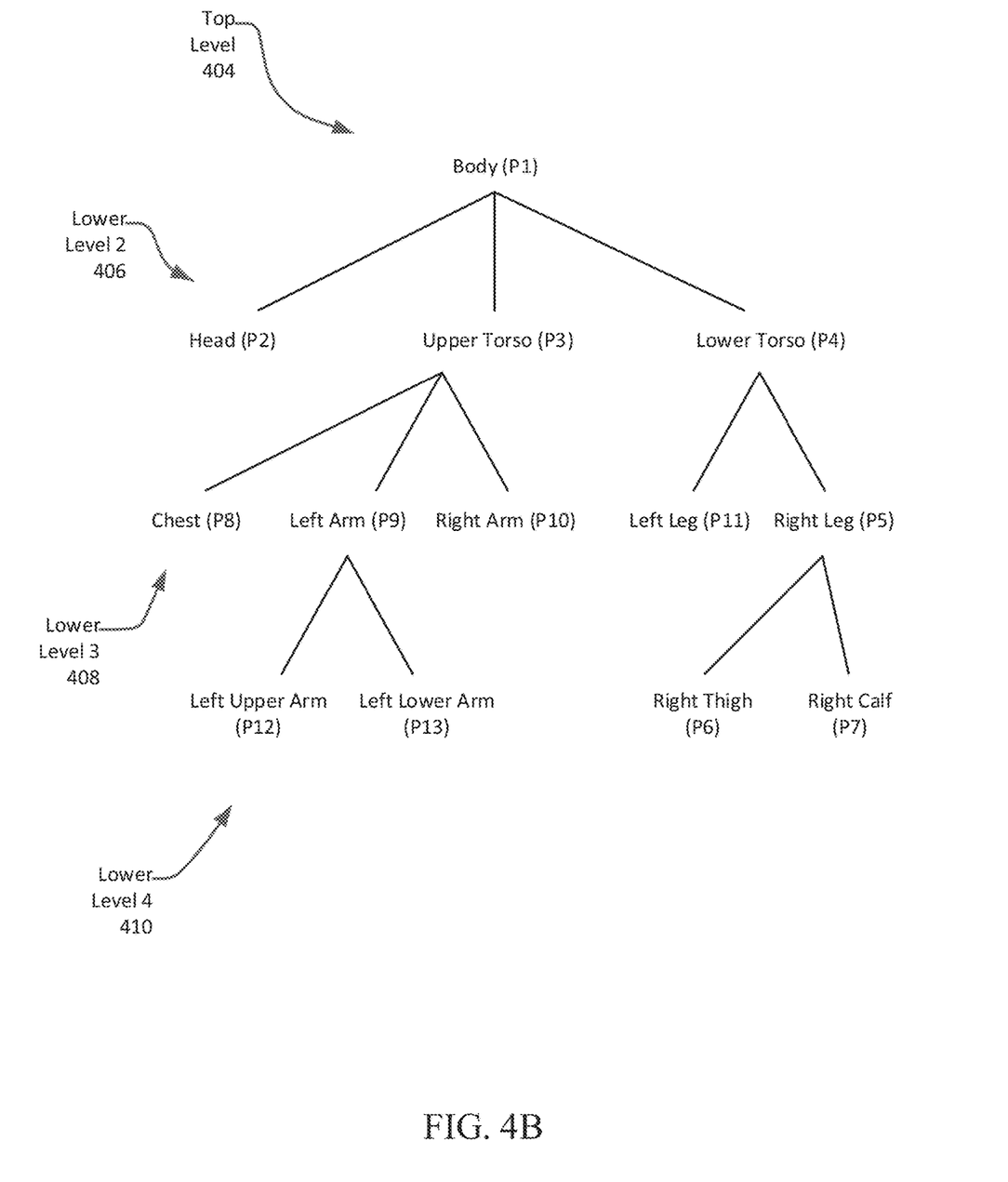
FIG. 4B illustrates a hierarchical structure of proposed regions, in accordance with certain embodiments of the present disclosure.

FIG. 4B more clearly illustrates the hierarchical structure of the proposed regions, in accordance with certain embodiments of the present disclosure. As shown, the body region is at the top level 404. Subsequent lower levels of the hierarchy 406, 408, 410 contain increasingly detailed regions. Each lower level can be considered as a child of the immediately upper parent level.

Figure 5:
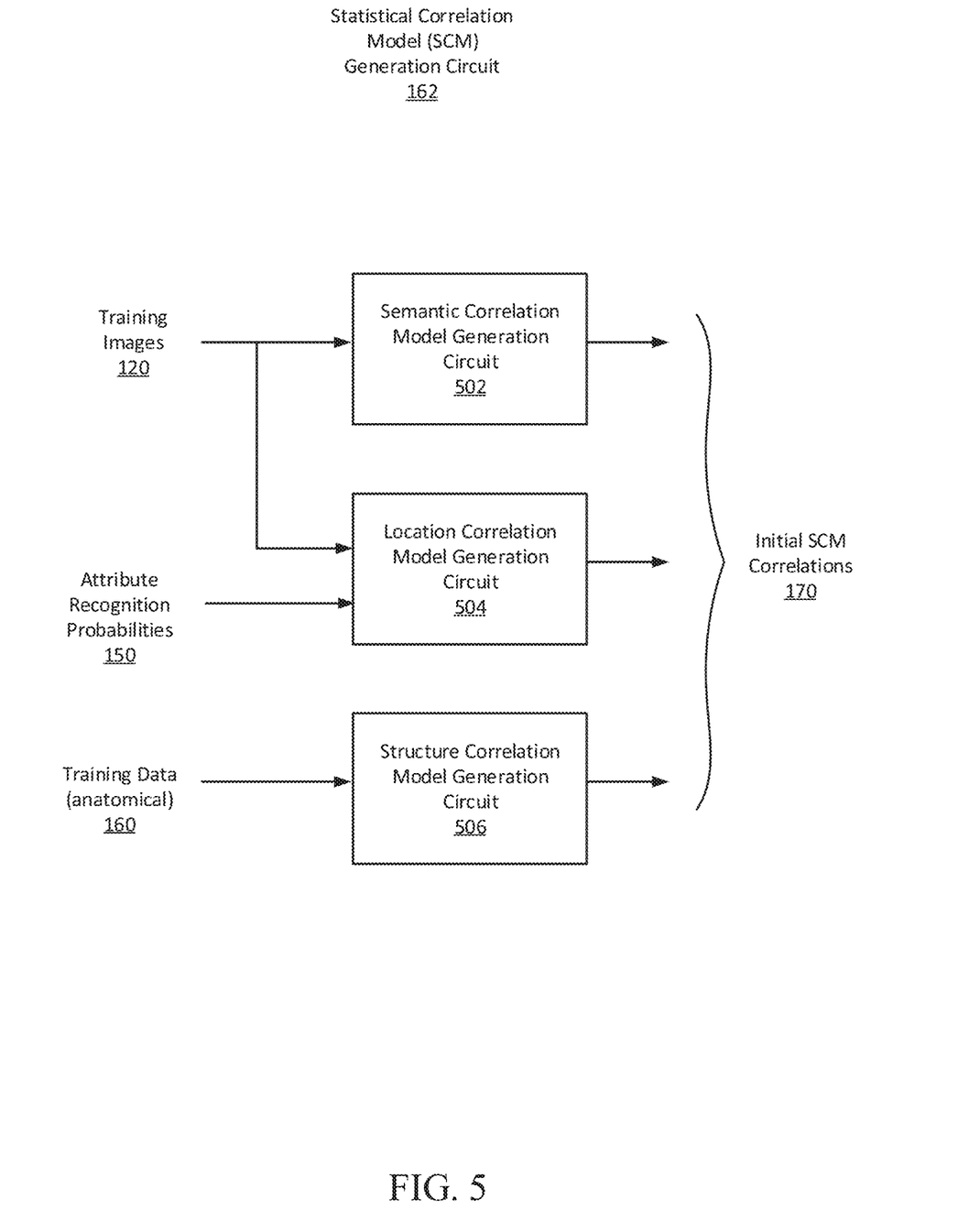
FIG. 5 is a block diagram of a statistical correlation model generation circuit, configured in accordance with certain embodiments of the present disclosure.

FIG. 5 is a block diagram of the SCM generation circuit 162, configured in accordance with certain embodiments of the present disclosure. The SCM generation circuit 162 is configured to generate SCM models 164 comprising an initial set of SCM correlations 170. Since key-points reflect the context of attributes in a human body, there are 3 types of statistical correlations that can be considered: the relationships between attributes; the relationships between key-points; and the relationships between attributes and key-points.

For relationships between attributes, there exists a semantic correlation. For example, if a person is female, then the probability of long hair may be higher than for a male. Similarly, if a person is male, then the probability that a skirt is being worn may be lower than for a female.

Attributes can designated as $a_1, a_2, \ldots, a_N$ with the entire set of N attributes designated as $A=\{a_1, a_2, \ldots, a_N\}$. The semantic correlation probability for each of the attributes $a_t$ can then be expressed as:

$$a_t = \sum_{i \in A, i \neq t} \delta_{it} a_i$$

$$\sum_{i=1}^{N} \delta_{it} = 1, 0 \leq \delta_{it} \leq 1$$

where $\delta_{it}$ is the correlation value between attributes $a_i$ and $a_t$, from semantic correlation model.

For relationships between key-points, there exists a structural correlation (e.g., left shoulder connects to left elbow). These structural correlations can be ascertained, for example, from biomedical studies and anatomical reference sources. Additionally, since proposed regions can be derived from key-points, as described previously, the hierarchical proposed regions can be considered as a variation of the key-point structure correlation models.

Proposals can be designated as $p_1, p_2, \ldots p_M$ with the entire set of M attributes designated as $P=\{p_1, p_2, \ldots, p_M\}$. Since proposals have a hierarchical structure derived from the human key-points' skeleton, the probability of parent proposal is derived from the child proposals. Designating $p_d$ as the parent proposal of child proposals $p_t$ and $p_k$, the probability of $p_d$ can be expressed as:

$$p_d = \theta_{dt} p_t + \theta_{dk} p_k$$

$$\theta_{dt} + \theta_{dk} = 1, 0 \leq \theta_{dt} \leq 1, 0 \leq \theta_{dk} \leq 1$$

where, $\theta_{dt}$ is the correlation value among hierarchical proposals $p_d$ and $p_t$, from the structure correlation model.

Finally, for relationships between attributes and key-points (and by extension, proposed regions), correlations can be calculated between proposal regions and attribute recognition rates/probabilities 150 resulting from the training of attribute recognition CNN 110, to treat proposals together or separately. An example of such calculations is illustrated in Table 1 below, which shows the attribute recognition rates versus proposals.

TABLE 1

| Attr | M | P1 | P2 | P3 | P4 | P5 | P6 | P7 | P8 | P9 | P10 |
|---|---|---|---|---|---|---|---|---|---|---|---|
| Male | 94.8 | 91.6 | 93.2 | 91.1 | 92.1 | 77.0 | 92.0 | 92.0 | 77.6 | 77.7 | 93.8 |
| hair | 89.0 | 82.3 | 86.7 | 84.7 | 86.4 | 53.1 | 85.6 | 85.8 | 54.8 | 55.0 | 87.8 |
| Glass | 90.0 | 87.8 | 88.3 | 69.6 | 81.0 | 29.4 | 80.7 | 81.0 | 29.1 | 29.9 | 88.7 |
| Hat | 93.8 | 90.7 | 92.6 | 64.7 | 74.8 | 33.8 | 74.7 | 75.5 | 32.2 | 32.8 | 93.3 |
| t-shirt | 76.2 | 47.2 | 66.2 | 72.8 | 72.8 | 41.1 | 71.4 | 71.3 | 42.0 | 42.0 | 70.2 |
| sleev | 93.8 | 66.4 | 83.7 | 90.2 | 90.7 | 74.0 | 89.4 | 89.7 | 74.5 | 74.4 | 90.0 |
| shorts | 93.4 | 24.2 | 41.7 | 50.7 | 54.5 | 90.8 | 55.2 | 55.3 | 90.5 | 90.1 | 78.2 |
| jeans | 89.2 | 45.7 | 49.8 | 63.1 | 70.1 | 88.3 | 70.0 | 70.7 | 88.2 | 88.0 | 82.3 |
| pants | 98.6 | 86.6 | 89.3 | 90.4 | 91.9 | 98.2 | 91.6 | 91.8 | 98.3 | 98.1 | 96.8 |
| mAP | 91.0 | 69.2 | 76.8 | 75.3 | 79.4 | 65.1 | 78.9 | 79.2 | 65.2 | 65.3 | 86.8 |

In this example, 9 attributes were chosen: male, hair, glasses, hat, T-shirt, sleeve shirt, shorts, jeans, and pants. Additionally, 10 proposals were chosen P1-P10, where P10 is the top level whole body proposal, P1 is the head proposal, P5 is the lower body proposal, P8 is the lower left body proposal, and P9 is the lower right body proposal. Note that these proposal numbers are different from the examples given in FIGS. 4A and 4B.

As can be seen from the table, P10 relates to most attributes (numbers in bold) since it covers the entire body. In contrast, P1, which covers the head region, relates more strongly to hair, glasses, and hat (numbers in bold), as opposed to T-shirt and shorts. Continuing with this example, P5, P8, and P9, which cover the lower body, relate more strongly to shorts, jeans, and pants. The bottom row of the table provides the mean average percent (mAP) for the attribute recognition rates versus proposals (i.e., the average of each column). The M column shows the attribute recognition rate using all proposals (P1-P10).

The SCM models 164 include a semantic correlation model, generated by circuit 502, to provide correlations between each of the attributes, a structure correlation model, generated by circuit 506, to provide correlations between each of the proposed hierarchical regions (based on the key-points), and a location correlation model, generated by circuit 504, to provide correlations between each of the attributes and each of the proposed hierarchical regions. The generation of the initial set of SCMs is based on training images 120 that include attribute labels and key-point labels, training data 160 that includes anatomical models, and attribute recognition probabilities 150 generated by the system in response to the training images.

These 3 relationships, semantic, location, and structure, provide for relatively simple SCM models 164 which need to be computed at least once, as part of the training process, which increases processing efficiency. The SCM models can also be used in the CNN training process to update the network relationship weights to improve the description accuracy of the relationships.

Returning now to FIG. 1, the CNN combination layer 116 is configured to generate recognition probabilities for the human attributes based on a combination of the attribute feature maps 130, the proposed hierarchical regions 140, and the SCMs 170 which provide correlations between the features of the attribute feature maps and the proposed hierarchical regions.

In some embodiments, the output of the CNN combination layer 116 can be expressed by the following equation:

$$S_f = \gamma \sum_{t \in A} \sum_{i \in A, i \neq t} \delta_{it} \sum_{j \in P} \beta_{ji} \sum_{k \in P_j} \theta_{kj} p_k$$

where $S_f$ is the output attribute recognition probabilities 150, $\gamma$ is a normalization factor, A is the set of all attributes of interest, P is the set of all proposals, $P_j$ is the set of child proposals for a parent proposal $p_j$, $\delta_{it}$ is the correlation between attributes $a_i$ and $a_t$ from the semantic correlation model, $\beta_{jk}$ is the correlation between attribute $a_k$ and proposal $p_j$ from the location correlation model (an example of which is shown in Table 1), and $\theta_{kj}$ is the correlation between proposals $p_k$ and $p_j$ from the structure correlation model.

Figure 6:
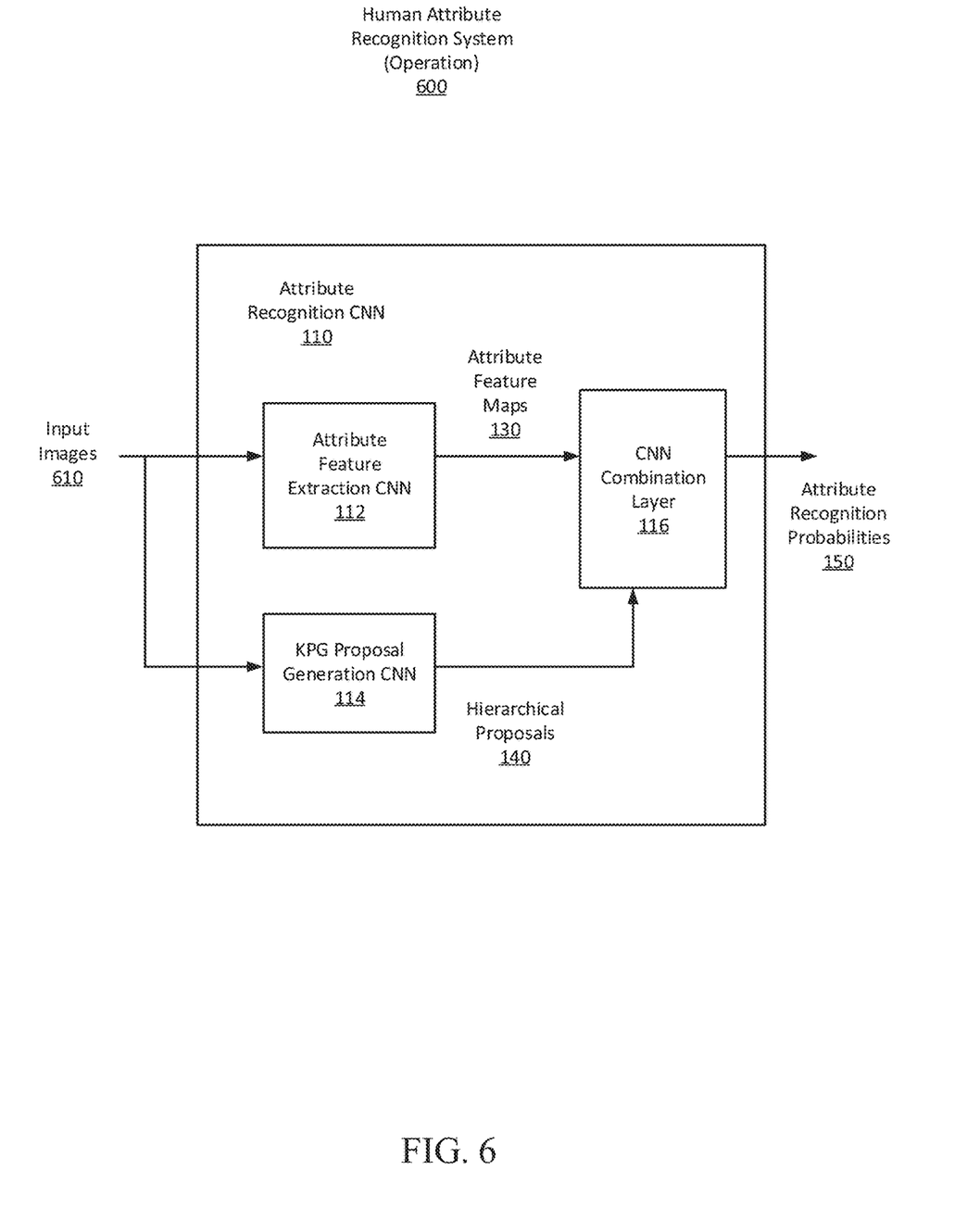
FIG. 6 is another block diagram of the human attribute recognition system, configured in accordance with certain embodiments of the present disclosure

FIG. 6 is another block diagram 600 of the human attribute recognition system 100, configured in accordance with certain embodiments of the present disclosure. In this figure, the system is shown in an operational configuration, which is to say, after the attribute recognition CNN 110, including subnetworks 112, 114, and 116, have been trained as previously described.

In operational mode, input images 610, which may depict humans with unknown combinations of attributes, are provided to the attribute recognition CNN 110, and attribute recognition probabilities 150 are generated as output.

Methodology

Figure 7:
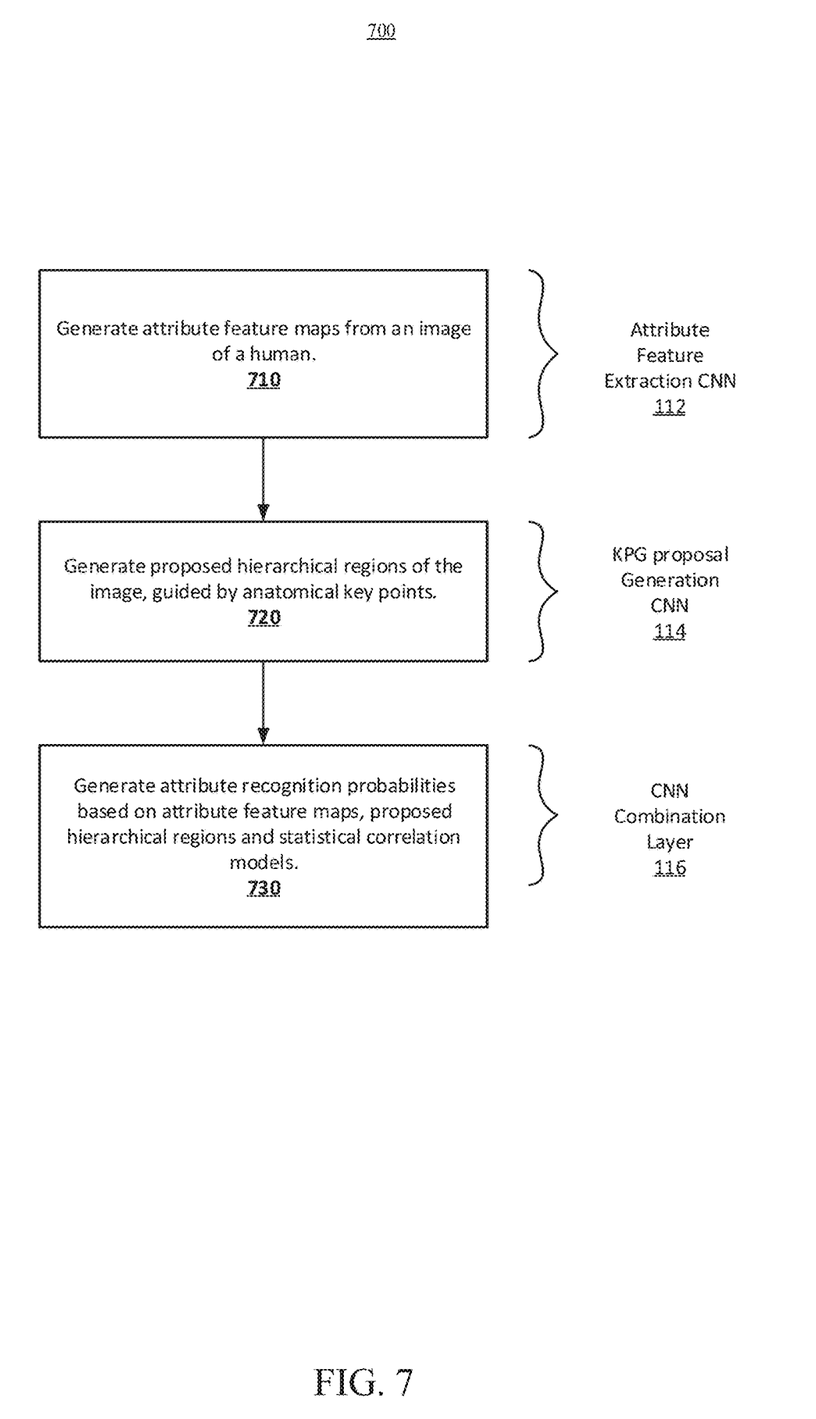
FIG. 7 is a flowchart illustrating a methodology for recognition of human attributes, in accordance with certain embodiments of the present disclosure.

FIG. 7 is a flowchart illustrating an example method 700 for recognition of human attributes, in accordance with certain embodiments of the present disclosure. As can be seen, the example method includes a number of phases and sub-processes, the sequence of which may vary from one embodiment to another. However, when considered in the aggregate, these phases and sub-processes form a process for attribute recognition in accordance with certain of the embodiments disclosed herein. These embodiments can be implemented, for example using the system architecture illustrated in FIGS. 1, 2, 5, and 6 as described above. However other system architectures can be used in other embodiments, as will be apparent in light of this disclosure. To this end, the correlation of the various functions shown in FIG. 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 700. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 7, in an embodiment, method 700 for recognition of human attributes commences by applying, at operation 710, an attribute feature extraction (AFE) convolutional neural network (CNN) to an image of a human to generate attribute feature maps based on the image. Attributes may include characteristics that can be visibly identified or inferred from an image, such as, but not limited to, gender, hairstyle, clothing style (e.g., jeans versus non-jeans), the wearing of eye glasses, the wearing of a hat, the wearing of shoes and type of footwear, etc.

Next, at operation 720, a key-point guided proposal (KPG) CNN is applied to the image of the human to generate proposed hierarchical regions of the image based on associated anatomical key-points. Key-points are associated with joints or other types of connection points between regions of the body, such as, for example, the neck, shoulders, elbows, wrists, hips (or waist), knees, and ankles. Associated hierarchical regions may include, for example, the entire body at the top level of the hierarchy, followed by the head, the upper torso, and the lower torso, at the next level, followed by the chest, arms, and legs at a lower level, followed by upper arms, lower arms, thighs, and calves, and a still lower level.

At operation 730, recognition probabilities are generated for the human attributes based on a CNN combination layer incorporating the attribute feature maps, the proposed hierarchical regions, and statistical correlation models (SCMs) which provide correlations between the features of the attribute feature maps and the proposed hierarchical regions. In some embodiments, the SCMs include a semantic correlation model to provide correlations between each of the attributes, a structure correlation model to provide correlations between each of the proposed hierarchical regions, and a location correlation model to provide correlations between each of the attributes and each of the proposed hierarchical regions.

Of course, in some embodiments, additional operations may be performed, as previously described in connection with the system. For example, an initial set of SCMs may be generated based on: training images that include attribute labels and key-point labels; training data that includes anatomical models; and attribute recognition probabilities generated by the system in response to the training images. Additionally, the AFE CNN may be trained on training images that include attribute labels, and the KPG CNN may be trained on training images that include attribute labels and on key-point training data sets.

Example System

Figure 8:
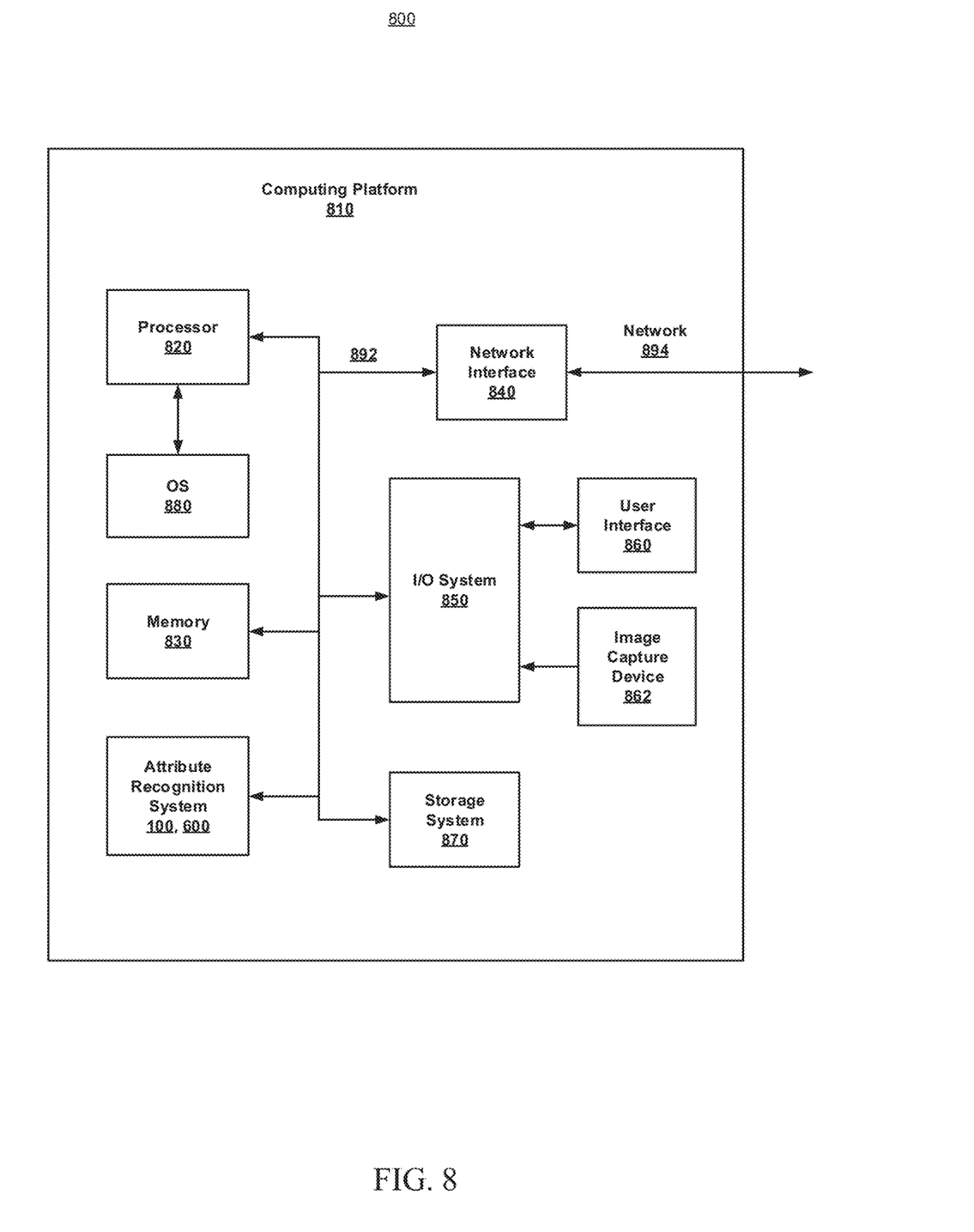
FIG. 8 is a block diagram schematically illustrating a computing platform configured to perform human attribute recognition, in accordance with certain embodiments of the present disclosure.

FIG. 8 illustrates an example system 800 to perform human attribute recognition, configured in accordance with certain embodiments of the present disclosure. In some embodiments, system 800 comprises a computing platform 810 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments.

In some embodiments, platform 810 may comprise any combination of a processor 820, a memory 830, attribute recognition systems 100, 600, a network interface 840, an input/output (I/O) system 850, a user interface 860, an image capture device 862, and a storage system 870.

As can be further seen, a bus and/or interconnect 892 is also provided to allow for communication between the various components listed above and/or other components not shown. Platform 810 can be coupled to a network 894 through network interface 840 to allow for communications with other computing devices, platforms, or resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with system 800. In some embodiments, the processor 820 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 800, and therefore may also be implemented using any suitable existing or subsequently-developed platform.

Network interface circuit 840 can be any appropriate network chip or chipset which allows for wired and/or wireless connection between other components of computer system 800 and/or network 894, thereby enabling system 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to, user interface 860 and image capture device 862 (e.g., a camera). User interface 860 may include devices (not shown) such as a display element, touchpad, keyboard, mouse, and speaker, etc. I/O system 850 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 810.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

The attribute recognition system, in training mode 100 and operational mode 600, are configured to recognize selected human attributes from an image, guided by anatomical key-points and statistic correlation models, as described previously. The attribute recognition systems may include any or all of the circuits/components illustrated in FIGS. 1, 2, 5, and 6, as described above. These components can be implemented or otherwise used in conjunction with a variety of suitable software and/or hardware that is coupled to or that otherwise forms a part of platform 810. These components can additionally or alternatively be implemented or otherwise used in conjunction with user I/O devices that are capable of providing information to, and receiving information and commands from, a user.

In some embodiments, the attribute recognition systems and circuits may be installed local to system 800, as shown in the example embodiment of FIG. 8. Alternatively, system 800 can be implemented in a client-server arrangement wherein at least some functionality associated with these systems is provided to platform 810 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 894 or remotely coupled to network 894 by one or more other networks and/or communication channels. In some cases, access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the human attribute recognition methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. In other embodiments, the functionalities disclosed herein can be incorporated into other image processing related software applications, such as, for example, security and surveillance applications, smart-home management, entertainment, and robotic applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a system for recognition of human attributes, the system comprising: an attribute feature extraction (AFE) convolutional neural network (CNN) to generate attribute feature maps based on an image of a human; a key-point guided proposal (KPG) CNN to generate proposed hierarchical regions of the image of the human based on associated anatomical key-points; a CNN combination layer to generate recognition probabilities for the human attributes based on the attribute feature maps, the proposed hierarchical regions, and statistical correlation models (SCMs), the SCMs providing correlations between the features of the attribute feature maps and the proposed hierarchical regions.

Example 2 includes the subject matter of Example 1, further comprising a statistical correlation model generation circuit to generate an initial set of SCMs, the SCMs comprising a semantic correlation model to provide correlations between each of the attributes, a structure correlation model to provide correlations between each of the proposed hierarchical regions, and a location correlation model to provide correlations between each of the attributes and each of the proposed hierarchical regions.

Example 3 includes the subject matter of Examples 1 or 2, wherein the generation of the initial set of SCMs is based on training images that include attribute labels and key-point labels, training data that includes anatomical models, and attribute recognition probabilities generated by the system in response to the training images.

Example 4 includes the subject matter of any of Examples 1-3, wherein the AFE CNN is trained on training images that include attribute labels.

Example 5 includes the subject matter of any of Examples 1-4, wherein the KPG CNN is trained on key-point training data sets and training images that include attribute labels.

Example 6 includes the subject matter of any of Examples 1-5, wherein the human attributes include at least one of gender, hairstyle, clothing type, wearing a hat, wearing eye glasses, and type of footwear.

Example 7 includes the subject matter of any of Examples 1-6, wherein the key-points include at least one of a neck, a left shoulder, a right shoulder, a left elbow, a right elbow, a left wrist, a right wrist, a left hip, a right hip, a left knee, a right knee, a left ankle, and a right ankle.

Example 8 includes the subject matter of any of Examples 1-7, wherein the proposed hierarchical regions include at least one of a body, a head, an upper torso, a lower torso, a chest, a left arm, a right arm, a left leg, a right leg, a left upper arm, a left lower arm, a right upper arm, a right lower arm, a left thigh, a left calf, a right thigh, and a right calf.

Example 9 is a computer-implemented method for recognition of human attributes, the method comprising: applying, by a computer processor, an attribute feature extraction (AFE) convolutional neural network (CNN) to an image of a human to generate attribute feature maps based on the image; applying, by the computer processor, a key-point guided proposal (KPG) CNN to the image of the human to generate proposed hierarchical regions of the image based on associated anatomical key-points; and generating, by the computer processor, recognition probabilities for the human attributes based on a CNN combination layer incorporating the attribute feature maps, the proposed hierarchical regions, and statistical correlation models (SCMs), the SCMs providing correlations between the features of the attribute feature maps and the proposed hierarchical regions.

Example 10 includes the subject matter of Example 9, further comprising generating an initial set of SCMs, the SCMs comprising a semantic correlation model to provide correlations between each of the attributes, a structure correlation model to provide correlations between each of the proposed hierarchical regions, and a location correlation model to provide correlations between each of the attributes and each of the proposed hierarchical regions.

Example 11 includes the subject matter of Examples 9 or 10, wherein the generation of the initial set of SCMs is based on training images that include attribute labels and key-point labels, training data that includes anatomical models, and attribute recognition probabilities generated by the CNN combination layer in response to the training images.

Example 12 includes the subject matter of any of Examples 9-11, further comprising training the AFE CNN on training images that include attribute labels.

Example 13 includes the subject matter of any of Examples 9-12, further comprising training the KPG CNN on key-point training data sets and training images that include attribute labels.

Example 14 includes the subject matter of any of Examples 9-13, wherein the human attributes include at least one of gender, hairstyle, clothing type, wearing a hat, wearing eye glasses, and type of footwear.

Example 15 includes the subject matter of any of Examples 9-14, wherein the key-points include at least one of a neck, a left shoulder, a right shoulder, a left elbow, a right elbow, a left wrist, a right wrist, a left hip, a right hip, a left knee, a right knee, a left ankle, and a right ankle.

Example 16 includes the subject matter of any of Examples 9-15, wherein the proposed hierarchical regions include at least one of a body, a head, an upper torso, a lower torso, a chest, a left arm, a right arm, a left leg, a right leg, a left upper arm, a left lower arm, a right upper arm, a right lower arm, a left thigh, a left calf, a right thigh, and a right calf.

Example 17 is at least one non-transitory computer readable storage medium having instructions encoded thereon that, when executed by one or more processors, result in the following operations for recognition of human attributes, the operations comprising: applying an attribute feature extraction (AFE) convolutional neural network (CNN) to an image of a human to generate attribute feature maps based on the image; applying a key-point guided proposal (KPG) CNN to the image of the human to generate proposed hierarchical regions of the image based on associated anatomical key-points; and generating recognition probabilities for the human attributes based on a CNN combination layer incorporating the attribute feature maps, the proposed hierarchical regions, and statistical correlation models (SCMs), the SCMs providing correlations between the features of the attribute feature maps and the proposed hierarchical regions.

Example 18 includes the subject matter of Example 17, the operations further comprising generating an initial set of SCMs, the SCMs comprising a semantic correlation model to provide correlations between each of the attributes, a structure correlation model to provide correlations between each of the proposed hierarchical regions, and a location correlation model to provide correlations between each of the attributes and each of the proposed hierarchical regions.

Example 19 includes the subject matter of Examples 17 or 18, wherein the generation of the initial set of SCMs is based on training images that include attribute labels and key-point labels, training data that includes anatomical models, and attribute recognition probabilities generated by the CNN combination layer in response to the training images.

Example 20 includes the subject matter of any of Examples 17-19, the operations further comprising training the AFE CNN on training images that include attribute labels.

Example 21 includes the subject matter of any of Examples 17-20, the operations further comprising training the KPG CNN on key-point training data sets and training images that include attribute labels.

Example 22 includes the subject matter of any of Examples 17-21, wherein the human attributes include at least one of gender, hairstyle, clothing type, wearing a hat, wearing eye glasses, and type of footwear.

Example 23 includes the subject matter of any of Examples 17-22, wherein the key-points include at least one of a neck, a left shoulder, a right shoulder, a left elbow, a right elbow, a left wrist, a right wrist, a left hip, a right hip, a left knee, a right knee, a left ankle, and a right ankle.

Example 24 includes the subject matter of any of Examples 17-23, wherein the proposed hierarchical regions include at least one of a body, a head, an upper torso, a lower torso, a chest, a left arm, a right arm, a left leg, a right leg, a left upper arm, a left lower arm, a right upper arm, a right lower arm, a left thigh, a left calf, a right thigh, and a right calf.

Example 25 is a system for recognition of human attributes, the system comprising: means for applying an attribute feature extraction (AFE) convolutional neural network (CNN) to an image of a human to generate attribute feature maps based on the image; means for applying a key-point guided proposal (KPG) CNN to the image of the human to generate proposed hierarchical regions of the image based on associated anatomical key-points; and means for generating recognition probabilities for the human attributes based on a CNN combination layer incorporating the attribute feature maps, the proposed hierarchical regions, and statistical correlation models (SCMs), the SCMs providing correlations between the features of the attribute feature maps and the proposed hierarchical regions.

Example 26 includes the subject matter of Example 25, further comprising means for generating an initial set of SCMs, the SCMs comprising a semantic correlation model to provide correlations between each of the attributes, a structure correlation model to provide correlations between each of the proposed hierarchical regions, and a location correlation model to provide correlations between each of the attributes and each of the proposed hierarchical regions.

Example 27 includes the subject matter of Examples 25 or 26, wherein the generation of the initial set of SCMs is based on training images that include attribute labels and key-point labels, training data that includes anatomical models, and attribute recognition probabilities generated by the system in response to the training images.

Example 28 includes the subject matter of any of Examples 25-27, further comprising means for training the AFE CNN on training images that include attribute labels.

Example 29 includes the subject matter of any of Examples 25-28, further comprising means for training the KPG CNN on key-point training data sets and training images that include attribute labels.

Example 30 includes the subject matter of any of Examples 25-29, wherein the human attributes include at least one of gender, hairstyle, clothing type, wearing a hat, wearing eye glasses, and type of footwear.

Example 31 includes the subject matter of any of Examples 25-30, wherein the key-points include at least one of a neck, a left shoulder, a right shoulder, a left elbow, a right elbow, a left wrist, a right wrist, a left hip, a right hip, a left knee, a right knee, a left ankle, and a right ankle.

Example 32 includes the subject matter of any of Examples 25-31, wherein the proposed hierarchical regions include at least one of a body, a head, an upper torso, a lower torso, a chest, a left arm, a right arm, a left leg, a right leg, a left upper arm, a left lower arm, a right upper arm, a right lower arm, a left thigh, a left calf, a right thigh, and a right calf.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A system for recognition of human attributes, the system comprising:
    an attribute feature extraction (AFE) convolutional neural network (CNN) to generate attribute feature maps based on an image of a human;
    a key-point guided proposal (KPG) CNN to generate proposed hierarchical regions of the image of the human based on associated anatomical key-points; and
    a CNN combination layer to generate recognition probabilities for the human attributes based on the attribute feature maps, the proposed hierarchical regions, and statistical correlation models (SCMs), the SCMs providing correlations between the features of the attribute feature maps and the proposed hierarchical regions.

2. The system of claim 1, further comprising a statistical correlation model generation circuit to generate an initial set of SCMs, the SCMs comprising a semantic correlation model to provide correlations between each of the attributes, a structure correlation model to provide correlations between each of the proposed hierarchical regions, and a location correlation model to provide correlations between each of the attributes and each of the proposed hierarchical regions.

3. The system of claim 2, wherein the generation of the initial set of SCMs is based on training images that include attribute labels and key-point labels, training data that includes anatomical models, and attribute recognition probabilities generated by the system in response to the training images.

4. The system of claim 1, wherein the AFE CNN is trained on training images that include attribute labels.

5. The system of claim 1, wherein the KPG CNN is trained on key-point training data sets and training images that include attribute labels.

6. The system of claim 1, wherein the human attributes include at least one of gender, hairstyle, clothing type, wearing a hat, wearing eye glasses, and type of footwear.

7. The system of claim 1, wherein the key-points include at least one of a neck, a left shoulder, a right shoulder, a left elbow, a right elbow, a left wrist, a right wrist, a left hip, a right hip, a left knee, a right knee, a left ankle, and a right ankle.

8. The system of claim 1, wherein the proposed hierarchical regions include at least one of a body, a head, an upper torso, a lower torso, a chest, a left arm, a right arm, a left leg, a right leg, a left upper arm, a left lower arm, a right upper arm, a right lower arm, a left thigh, a left calf, a right thigh, and a right calf.

9. A computer-implemented method for recognition of human attributes, the method comprising:
    applying, by a computer processor, an attribute feature extraction (AFE) convolutional neural network (CNN) to an image of a human to generate attribute feature maps based on the image;
    applying, by the computer processor, a key-point guided proposal (KPG) CNN to the image of the human to generate proposed hierarchical regions of the image based on associated anatomical key-points; and
    generating, by the computer processor, recognition probabilities for the human attributes based on a CNN combination layer incorporating the attribute feature maps, the proposed hierarchical regions, and statistical correlation models (SCMs), the SCMs providing correlations between the features of the attribute feature maps and the proposed hierarchical regions.

10. The method of claim 9, further comprising generating an initial set of SCMs, the SCMs comprising a semantic correlation model to provide correlations between each of the attributes, a structure correlation model to provide correlations between each of the proposed hierarchical regions, and a location correlation model to provide correlations between each of the attributes and each of the proposed hierarchical regions; wherein the generation of the initial set of SCMs is based on training images that include attribute labels and key-point labels, training data that includes anatomical models, and attribute recognition probabilities generated by the CNN combination layer in response to the training images.

11. The method of claim 9, further comprising: training the AFE CNN on training images that include attribute labels; and training the KPG CNN on key-point training data sets and training images that include attribute labels.

12. The method of claim 9, wherein:
    the human attributes include at least one of gender, hairstyle, clothing type, wearing a hat, wearing eye glasses, and type of footwear;
    the key-points include at least one of a neck, a left shoulder, a right shoulder, a left elbow, a right elbow, a left wrist, a right wrist, a left hip, a right hip, a left knee, a right knee, a left ankle, and a right ankle; and
    the proposed hierarchical regions include at least one of a body, a head, an upper torso, a lower torso, a chest, a left arm, a right arm, a left leg, a right leg, a left upper arm, a left lower arm, a right upper arm, a right lower arm, a left thigh, a left calf, a right thigh, and a right calf.

13. At least one non-transitory computer readable storage medium having instructions encoded thereon that, when executed by one or more processors, result in the following operations for recognition of human attributes, the operations comprising:
    applying an attribute feature extraction (AFE) convolutional neural network (CNN) to an image of a human to generate attribute feature maps based on the image;
    applying a key-point guided proposal (KPG) CNN to the image of the human to generate proposed hierarchical regions of the image based on associated anatomical key-points; and
    generating recognition probabilities for the human attributes based on a CNN combination layer incorporating the attribute feature maps, the proposed hierarchical regions, and statistical correlation models (SCMs), the SCMs providing correlations between the features of the attribute feature maps and the proposed hierarchical regions.

14. The computer readable storage medium of claim 13, the operations further comprising generating an initial set of SCMs, the SCMs comprising a semantic correlation model to provide correlations between each of the attributes, a structure correlation model to provide correlations between each of the proposed hierarchical regions, and a location correlation model to provide correlations between each of the attributes and each of the proposed hierarchical regions.

15. The computer readable storage medium of claim 14, wherein the generation of the initial set of SCMs is based on training images that include attribute labels and key-point labels, training data that includes anatomical models, and attribute recognition probabilities generated by the CNN combination layer in response to the training images.

16. The computer readable storage medium of claim 13, the operations further comprising training the AFE CNN on training images that include attribute labels.

17. The computer readable storage medium of claim 13, the operations further comprising training the KPG CNN on key-point training data sets and training images that include attribute labels.

18. The computer readable storage medium of claim 13, wherein the human attributes include at least one of gender, hairstyle, clothing type, wearing a hat, wearing eye glasses, and type of footwear.

19. The computer readable storage medium of claim 13, wherein the key-points include at least one of a neck, a left shoulder, a right shoulder, a left elbow, a right elbow, a left wrist, a right wrist, a left hip, a right hip, a left knee, a right knee, a left ankle, and a right ankle.

20. The computer readable storage medium of claim 13, wherein the proposed hierarchical regions include at least one of a body, a head, an upper torso, a lower torso, a chest, a left arm, a right arm, a left leg, a right leg, a left upper arm, a left lower arm, a right upper arm, a right lower arm, a left thigh, a left calf, a right thigh, and a right calf.

* * * * *